United States Patent [19]

Okada

[11] Patent Number: 4,992,652
[45] Date of Patent: Feb. 12, 1991

[54] FOCUS ERROR DETECTING CIRCUIT FOR DISK PLAYER

[75] Inventor: Hitoshi Okada, Chiba, Japan

[73] Assignee: Sony Corporation, Tokyo, Japan

[21] Appl. No.: 446,444

[22] Filed: Dec. 5, 1989

[30] Foreign Application Priority Data

Dec. 14, 1988 [JP] Japan .................. 63-315673

[51] Int. Cl.[5] ............................................ H01J 40/14
[52] U.S. Cl. ................ 250/201.4; 369/44.41
[58] Field of Search ............ 250/201.4, 201.5, 204; 369/44.23, 44.41, 44.42

[56] References Cited

U.S. PATENT DOCUMENTS

| | | | |
|---|---|---|---|
| 4,544,838 | 10/1985 | Musha et al. | 369/44.41 |
| 4,654,838 | 3/1987 | Sugiki | 369/44.42 |
| 4,658,391 | 4/1987 | Nozu et al. | 369/44.23 |
| 4,695,158 | 9/1987 | Kotaka et al. | 369/44.42 |
| 4,744,069 | 5/1988 | Sugiyama et al. | 369/44.41 |

Primary Examiner—David C. Nelms
Assistant Examiner—Stephone B. Allen
Attorney, Agent, or Firm—Alvin Sinderbrand; William S. Frommer

[57] ABSTRACT

This invention relates to a focusing error detection circuit employed in an optical pickup of an optical disk apparatus or the like. The laser light received from the recording medium is detected by a photodetector and processed in a focusing error computing device to form a first focusing error signal. The first focusing error signal is sampled and held at the timing of periodic turn-off of the laser beam and the sampled-and-held signal is subtracted from the first focusing error signals to produce a second focusing error signal. The second focusing error signal is freed of adverse effects caused by factors, such as temperature changes of the focusing error computing device thereby enabling the accurate focusing servo control of the optical pickup device.

6 Claims, 4 Drawing Sheets

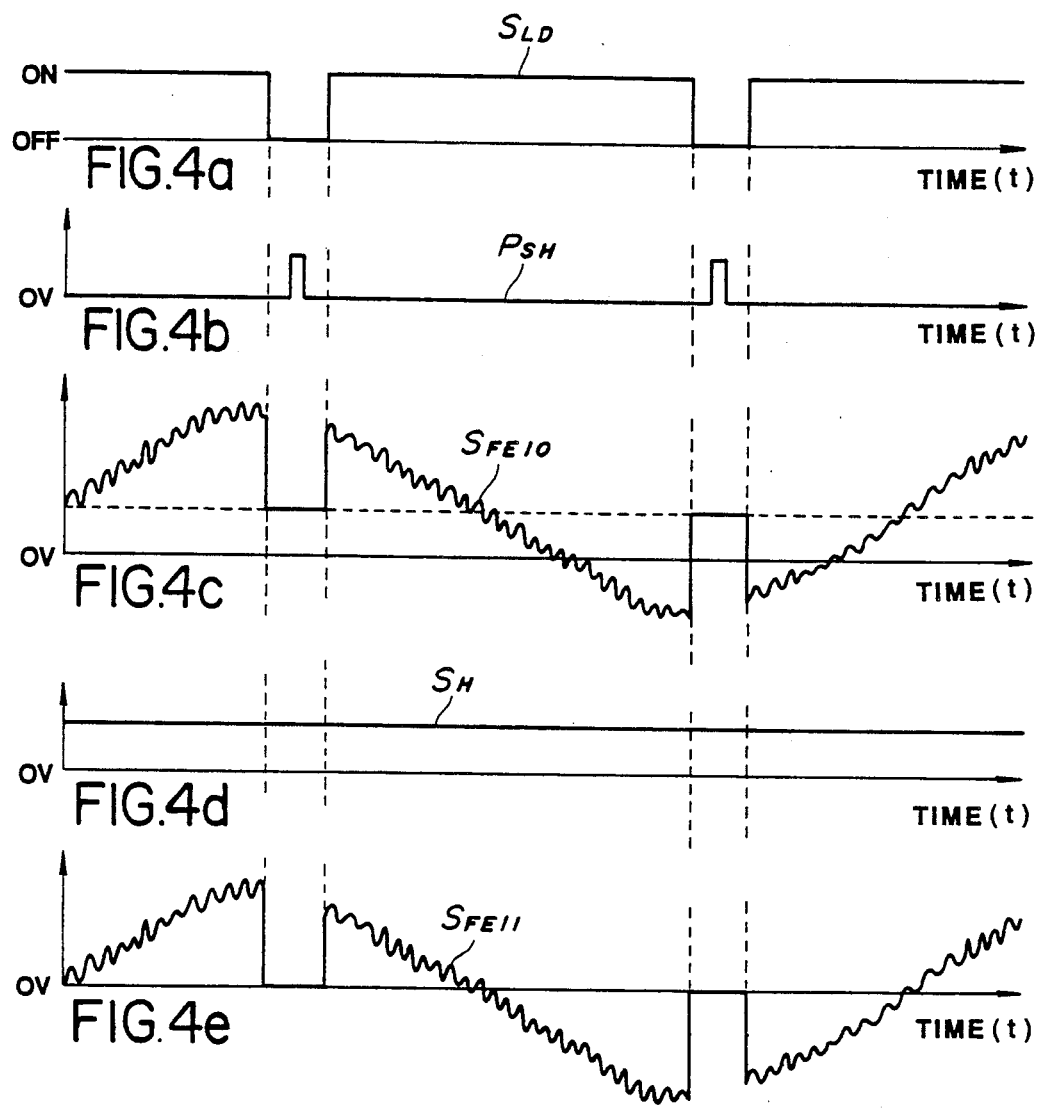

FOCUS ERROR DETECTING CIRCUIT FOR DISK PLAYER

BACKGROUND OF THE INVENTION

1. Field of the Invention

The present invention relates to a focusing error detection circuit which may be used with, for example, an optical pickup of an optical disk apparatus.

2. Description of the Prior Art

In a conventional apparatus for recording and/or reproducing information signals on or from an optical disk, an optical pickup device is used, in which a light beam from a semiconductor laser is collected by an objective lens, is irradiated on the recording tracks of an optical disk and the reflected return light from the disk is detected to effect the readout and/or writing of the information signals.

A conventional optical pickup device includes a built-in focusing control unit for controlling an objective lens such that the light beam collected by the objective lens is irradiated onto the recording tracks of the optical lens in a focused state. The focusing control unit performs focusing control in response to focusing error signals by driving a supporting unit, which supports the object lens and is movable in two directions, specifically, along the optical axis of the object lens and along the direction normal to the optical axis and which are both within a horizontal plane. A conventional supporting unit for supporting the object lens to move in the two mutually prependicular directions is shown for example in the U.S. Pat. No. 4,473,274. The focusing error signals are produced by detecting with a photodetector device the state of the reflected return light which has been once irradiated onto and reflected by the optical disk surface. A known device for detecting these focusing error signals, is a so-called focusing error detection circuit, operating in accordance with the astigmatic method for example, as disclosed in U.S. Pat. No. 4,023,033.

As shown in FIG. 1, in a known focusing error detection circuit 1 which employs the astigmatic system, laser light irradiated onto an optical disk, not shown, from an optical pickup, also not shown, and then reflected by the optical disk, to forms a return beam which impinges, as a light spot SP, on a four-segment photodetector 2.

When the return beam falls on the four-segment photodetector 2 in the form of the light spot SP, light reception currents $S_A$, $S_B$, $S_C$ and $S_D$ are generated as outputs from first to fourth photodetector segments 2A, 2B, 2C and 2D of the four-segment photodetector, respectively. The light reception currents $S_A$, $S_B$, $S_C$ and $S_D$ are supplied to the inverting inputs of first to fourth current-to-voltage converters 3A, 3B, 3C and 3D constituted by respective operational amplifiers.

The current to voltage converters 3A to 3D are provided with negative feedback paths including resistors $R_{A1}$, $R_{B1}$, $R_{C1}$ and $R_{D1}$, respectively, while having their non-inverting inputs grounded. The first to fourth light reception voltages $V_A$, $V_B$, $V_C$ and $V_D$, converted from the light reception currents $S_A$, $S_B$, $S_C$ and $S_D$, respectively, are outputted from the output terminals of the converters 3A, 3B, 3C, 3D, respectively.

Each of the first to fourth light reception voltages $V_A$ to $V_D$ is added to another light reception voltage. The first and the third light reception voltages $V_A$ and $V_C$ are transmitted through first and third resistor $R_{A2}$ and $R_{C2}$, each of equal resistance values, and added together before being entered into a non-inverting input of a subtractor 4 of an operational amplifier configuration. In the same manner, the second and the fourth light reception voltages $V_B$ and $V_D$ are transmitted through second and fourth resistor $R_{B2}$ and $R_{D2}$, each of equal resistance values, and added together before being entered into an inverting input of the subtractor 4.

The subtractor 4 has a negative feedback path, through a resistor $R_1$ and has its non-inverting input grounded through resistor $R_2$. A differential voltage, which is the difference between the sum voltage of the first and the third light reception voltages $V_A$ and $V_C$ and the sum voltage of the second and the fourth light reception voltages $V_B$ and $V_D$, is obtained at the output of the subtractor 4. In this manner, the focusing error detection circuit 1 of an astigmatic system generates a focusing error signal $S_{FE}$ from the light reception currents $S_A$ to $S_D$ of the four-segment photodetector 2 according to the formula $$S_{FE} = (S_A + S_C) - (S_B + S_D) \tag{1}$$

In order that the problems overcome by the present invention may be fully understood, the focusing error signal $S_{FE}$ and the RF signal $S_{RF}$ will be described with reference to FIGS. 2a, 2b and 2c.

In FIG. 2a, the focusing error signal $S_{FE}$ is shown to be generated so as to have a voltage waveform in the form of a letter S with respect to the distance between the optical disk and the objective lens of the optical pickup device.

The objective lens of the optical pickup device is usually controlled by a focusing servo device so that the detected focusing error signal $S_{FE}$ will be at a point of intersection $P_0$ between the central portion of the S-shaped voltage waveform and the zero voltage, called a zero-crossing-point. At the zero-crossing-point, the laser light of the optical pickup device is irradiated on the optical disk in the just focused state or the correctly focused state.

In FIG. 2b, the focusing error detection circuit 1 is assuumed to be susceptible to DC drift due to changes in the operating temperature or the environmental temperature of the operational amplifiers of the substractor 4 and the current-to-voltage converters 3A to 3D. A DC offset proportional to the change in temperature shifts the focusing error signal $S_{FE1}$ to cause fluctuations in the zero-crossing-point $P_1$ and, hence, in the operating point of the focusing servo device.

The DC offset, which is proportional to the DC drift, becomes conspicuous in the event of significant changes in temperature, when the volume of the incident light impinging on the four-segment photodetector 2 is small, or when a broad bandwidth DC amplifier circuit is used as the operational amplifier of the subtractor 4.

FIG. 2c shows that the subtractor 4, when designed with a broad bandwidth DC amplifier circuit, generates as output an RF signal $S_{RF}$. When exposed to significant changes in temperature, $P_0$ on the RF signal $S_{RF}$ shifts on the curve from $P_0$ to $P_1$ and, accordingly, cannot be reproduced correctly.

OBJECT AND SUMMARY OF THE INVENTION

It is a principal object of the present invention to provide a focusing error detection circuit wherein the adverse effects of DC drift, typically caused by temperature changes, may be effectively removed to permit correct detection of focusing errors at all times.

For accomplishing the above object, in accordance with an aspect of the present invention, there is provided a focusing error detection device in which the return laser beam after having been once irradiated from the optical device onto the recording medium and the reflected from the later, is received by light receiving means, such as a photodetector, which detects the focusing error of the light beam, and wherein, focusing error computing means is provided for computing the focusing errors by arithmetic operations using the output of the light reception currents from said light receiving means generating a first focusing error signal. A sample-and-hold means is provided for sampling-and-holding said first focusing error signal at the timing of periodic turn-off of said laser light generating a sample-and-hold signal as output. Finally, a subtraction means is provided for computing the difference between said first focusing error signal and said sample-and-hold signal producing a second focusing error signal.

In the above described focusing error detection circuit, the first focusing error signal $S_{FE10}$, computed by the focusing error computing means 11, sampled-and-held at the timing of the periodic turning off of the laser light, so that it is only the DC drift caused by, for example, the temperature changes of the focusing error computing means, is sampled-and-held. The sample-and-hold signal is subtracted from the first focusing error signal producing the second focusing error signal which eliminates the adverse effects of DC drift enabling the focusing error to be detected correctly at all times.

The above, and other objects, features, and advantages of the present invention will be apparent in the following detailed description of the preferred embodiment of the invention when read in conjunction with the accompanying drawings.

BRIEF DESCRIPTION OF THE DRAWINGS

FIGS. 4a, 4b, 4c, 4d and 4e are signal waveform diagrams illustrating the operation of a focusing error detection circuit according to an embodiment of the present invention.

Detailed Description of Preferred Embodiment

A focusing error detection device according to an embodiment of the present invention will now be described with reference to FIG. 3.

Figure 3:
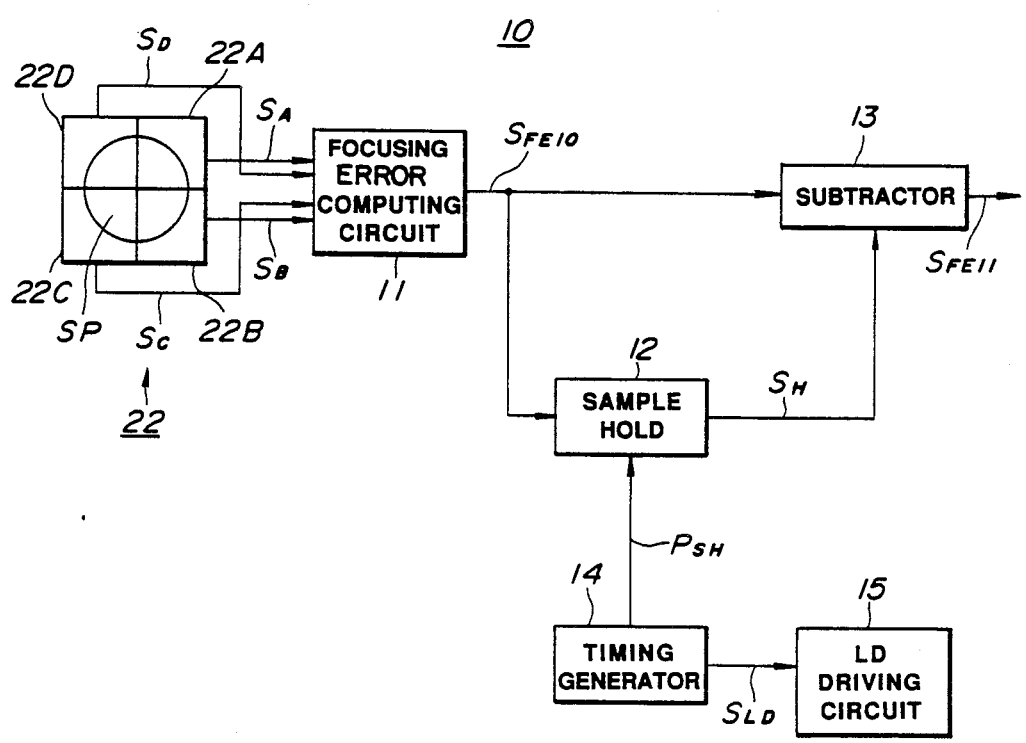
FIG. 3 is a circuit diagram showing a focusing error detection circuit according to an embodiment of the present invention.

In FIG. 3, a focusing error detection circuit 10 has a four-segment photodetector 22 for detecting the return beam of a laser light irradiated from an optical pickup, not shown, onto an optical disk, also not shown, and reflected from the disk. The reflected return beam from the disk forms a light spot SP on the four-segment photodetector 22.

For ease of illustration, the return beam forming light spot SP impinges equally on the first, second, third and fourth segments 22A, 22B, 22C and 22D, respectively, of the four-segment photodetector 22 generating light reception currents $S_A$, $S_B$, $S_C$ and $S_D$, respectively, as output. Each of the light reception current output signals $S_A$, $S_B$, $S_C$ and $S_D$ are supplied to a focusing error computing circuit 11.

Figure 1:
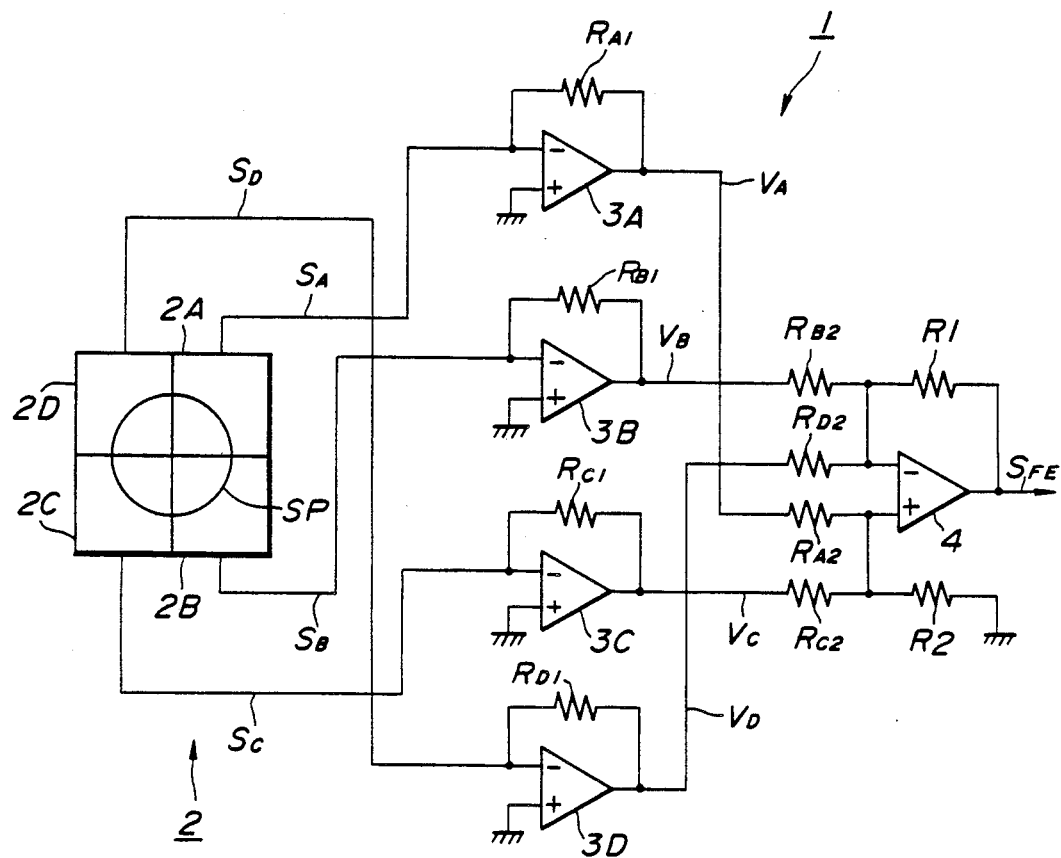
FIG. 1 is a circuit diagram showing a conventional focusing error detection circuit.
Figure 2:
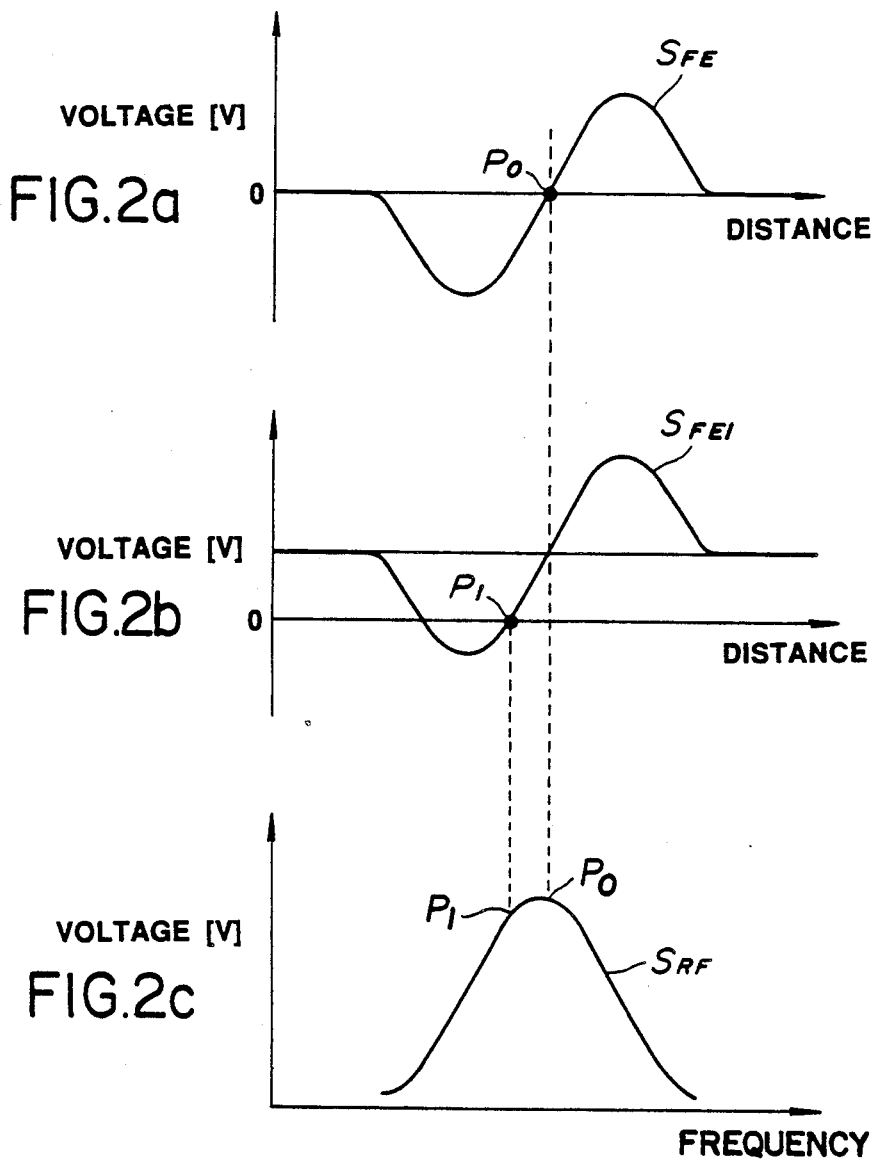
FIGS. 2a, 2b and 2c are signal waveform diagrams illustrating the operation of the device shown in FIG. 1 under different temperature conditions.

The focusing error computing circuit 11, similarly configured to the focusing error computing circuit of FIG. 1, adaptively performs an arithmetic operation of formula (1). Based upon formula (1), the light reception currents $S_A$ to $S_D$ from the four-segment photodetector 22 generate a first focusing error signal $S_{FE10}$ in accordance with the astigmatic system.

In the focusing error detection circuit 10, the first focusing error signal $S_{FE10}$ from the focusing error computing circuit 11 is supplied to a sample-and-hold circuit 12 and a subtractor 13.

The sample-and-hold circuit 12 operates to sample and hold the first focusing error signal $S_{FE10}$, which is released at the timing of a sampling pulse $P_{SH}$ produced by a timing generator 14, transmitting a sample-and-hold signal $S_H$ as output to the subtractor 13.

The subtractor 13 subtracts the sample-and-hold signal $S_H$ from the first focusing error signal $S_{FE10}$ and generater as output a second focusing error signal $S_{FE11}$.

Referring to FIG. 3 and FIGS. 4a, 4b, 4c, 4d and 4e, the operation of the focusing error detection circuit 10, according to an embodiment of the present invention will now be described.

At a predetermined constant time interval, the timing generator 14 transmits a laser driving signal $S_{LD}$ to a laser driving circuit 15. In FIG. 4a, the laser driving signal $S_{LD}$ interrupts or stops the light emitting operation of the laser driving circuit 15 for a short time during which the focusing servo device cannot perform a follow-up movement. In FIG. 4b, the timing generator 14 also transmits a sampling pulse $P_{SH}$, which rises during the periodic turn-off interval of the laser, to the sample-and-hold circuit 12.

In FIG. 4c of the present embodiment, the first focusing error signal $S_{FE10}$ is sampled at the timing of turning off of the laser to sample-and-hold only the DC offset formed by the DC drift in the focusing error computing circuit 11 caused by, for example, changes in the temperature. In FIG. 4d, the sample-and-hold signal $S_H$, formed only by the DC offset is subtracted from the first focusing error signal $S_{FE10}$ eliminating the effects of DC drift and generating the second focusing error signal $S_{FE11}$ having a corrected waveform as shown in FIG. 4e.

By this method, as used in the above described focusing error detection circuit according to the present invention, the effects of the DC drift caused by, for example, changes in the temperature in the focusing error computing circuit 11, focusing errors can be detected correctly at all times.

Furthermore, in a preferred embodiment of the present invention of the same construction, the DC characteristics can be reproduced even when the focusing error computing circuit is the an AC coupled circuit. Therefore, with the focusing error detection circuit according to the present invention, each DC operational amplifier of the focusing error computing circuit can be replaced with an AC amplifier which enables a high-speed arithmetic operation, such that a reliable high-speed focusing servo device can be made.

The preferred embodiment is not limited to the case which turns off the laser at predetermined constant time intervals for a short time during which the focusing servo cannot perform a follow-up movement. For example, if the recording tracks on the optical disk are formed in accordance with a sample format system in which sevo areas are provided at intervals of a predetermined period, then the present invention may be designed such that the laser light may be eliminated by the mirror portions of these servo areas.

Moreover, since the focusing servo operation is performed in the servo areas, the first focusing error output signals from the focusing error computing circuit may be sampled-and-held at the timing interval of the servo areas before being transmitted to the subtractor.

Still further, when recording video signals onto an optical disk, effects similar to those achieved in the above embodiment may be achieved by turning off the laser light at each vertical blanking period.

Although the embodiment of the present invention is applied to an optical pickup of an optical disk apparatus in which focusing errors are detected by the astigmatic method, the invention may be applied to other focusing error detecting methods. The present invention may also be applied extensively to other optical recording-/reproducing apparatus other than the optical disk apparatus, such as a magneto-optical disk, optical card or optical tape apparatus.

What is claimed is:

1. In a focusing error detection circuit having light detecting means for receiving laser light impinging thereon from a recording medium and provided to detect focusing errors of an optical pickup device, the combination of first focusing error computing means for arithmetic operation on outputs from said light detecting means to produce a first focusing error signal, means for periodically interrupting impingement of said laser light on said light detection means, sample-and-hold means for sampling-and-holding said first focusing error signal during the period of interruption of the impingement on said light detecting means of said laser light to output a sampled-and-held signal, and second focusing error computing means for computing the difference between said first focusing error signal and said sampled-and-held signal to produce a compensated focusing error signal.

2. A focusing error detection circuit according to claim 1 wherein said light detecting means includes a photodetector having first and second pairs of diagonally positional regions, and wherein said first focusing error computing means includes first and second summation means for computing the sum of output signals of said first and second pairs, respectively, of diagonally positioned detection regions of said photodetector and subtraction means for determining the difference between the outputs of said first summation means and said second summation means said difference being said first focusing error signal.

3. A focusing error detection circuit according to claim 1 further comprising laser driving means, and focusing servo means; and wherein said means for periodically interrupting impingement of said laser light on said light detecting means includes timing generating means producing a laser drive control signal for interrupting the light emitting operation of a laser driving means for a predetermined length of time during which a focusing servo device cannot perform a follow-up movement, and said means also adapted for supplying a sampling pulse to said sample-and-hold means in response to said laser drive control signal.

4. A focusing error detection circuit according to claim 3 wherein said means detects the mirror portions formed in servo areas recorded on said recording medium at intervals of a predetermined period for generating said laser drive control signal.

5. A focusing error detection circuit according to claim 4 wherein said means transmits said sampling pulse to said sample-and-hold means at the interval of said servo areas recorded on said recording medium at intervals of a predetermined period.

6. A focusing error detection circuit according to claim 3 wherein said means generates said laser drive control signal during the period of vertical blanking of a video signal recorded on said recording medium.

* * * * *